No. 875,757.

PATENTED JAN. 7, 1908.

T. S. WATSON.
MAGNETIC CLUTCH.
APPLICATION FILED APR. 1, 1907.

Witnesses.

Inventor.
Thomas S. Watson,
By Benedict, Morsell & Caldwell.
Attorneys.

UNITED STATES PATENT OFFICE.

THOMAS S. WATSON, OF MILWAUKEE, WISCONSIN.

MAGNETIC CLUTCH.

No. 875,757.  Specification of Letters Patent.  Patented Jan. 7, 1908.

Application filed April 1, 1907. Serial No. 365,642.

*To all whom it may concern:*

Be it known that I, THOMAS S. WATSON, residing in Milwaukee, in the county of Milwaukee and State of Wisconsin, have invented new and useful Improvements in Magnetic Clutches, of which the following is a description, reference being had to the accompanying drawings, which are a part of this specification.

This invention has for its object to provide a clutch for coupling a driving part with a driven part by closing a circuit through an electro magnet and thereby cause the engagement of a member of the driving part with the driven part and through the resulting torsion produce the expansion or contraction of a coil member carried by the driving part and cause it to frictionally engage the driven part.

Another object of this invention is to improve upon details of construction of a magnetic clutch of this type.

With the above and other objects in view the invention consists in the magnetic clutch herein claimed, its parts and combinations of parts and all equivalents.

Figure 1:
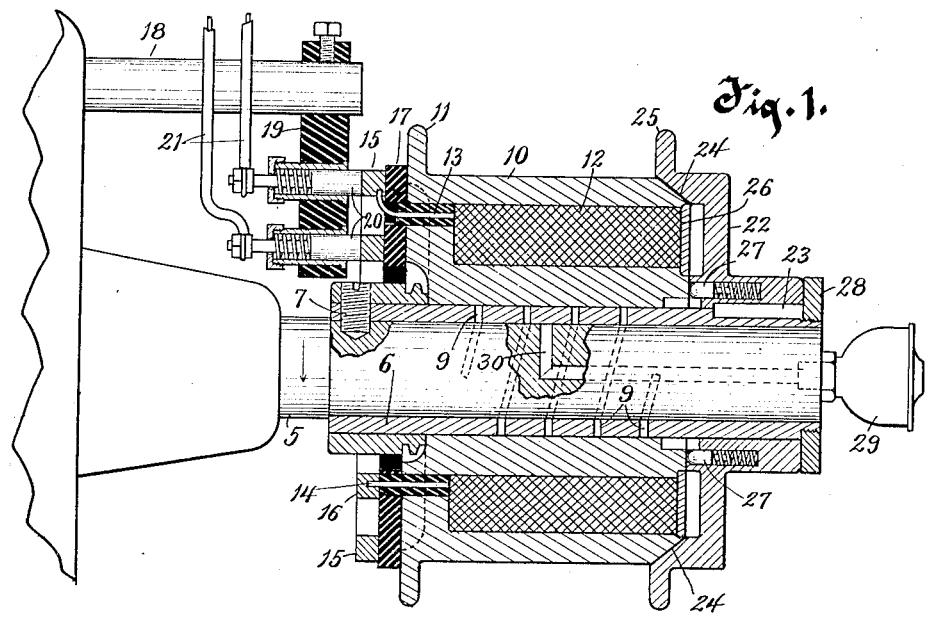
Figure 2:
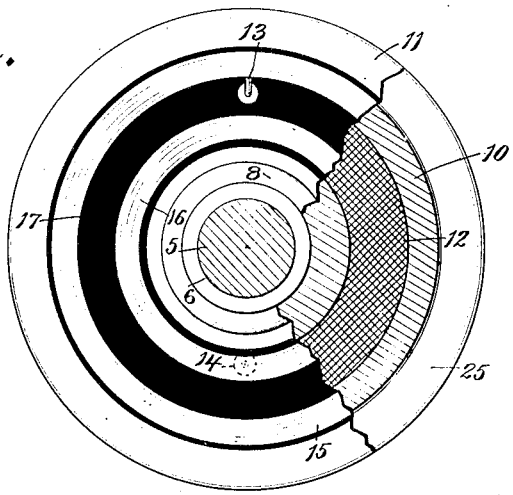

Referring to the accompanying drawings in which like characters of reference indicate the same parts in the different views; Figure 1 is a central sectional view of a magnetic clutch constructed in accordance with this invention; and, Fig. 2 is an end elevation thereof with parts broken away for clearness of illustration.

In these drawings 5 represents a driving shaft, which may be the shaft of an electric motor or any other suitable driving means, and 6 is a sleeve mounted thereon and rigidly locked thereto at one end by a set screw 7 passing through a collar 8 around the sleeve and through the said sleeve and into the shaft 5. The sleeve 6 is preferably of phosphor-bronze or other suitable spring metal and is provided with a spirally cut slot 9 by means of which the middle portion becomes a spiral or coil spring.

A cylindrical casing 10 with an inner cylindrical portion and one closed end is loosely fitted on the sleeve 6 and against the collar 8 and constitutes a driven member in the form of a belt pulley with a flange 11 for guiding the belt. The casing 10 also constitutes a housing or receptacle for a magnet coil 12 around the inner cylindrical portion as a core, the terminals 13 and 14 of which pass through insulating bushings in the closed end of the casing and connect with collector rings 15 and 16 respectively arranged concentric with the shaft on an insulating ring 17 carried by the closed end of the casing.

A rod or support 18 on the motor frame or otherwise conveniently located has an insulating arm 19 adjustably mounted thereon and carrying spring pressed brushes 20 engaging the respective collector rings 15 and 16, said brushes being connected by wires 21 with a suitably controlled source of supply, whereby the magnet may be energized and deënergized by closing and opening the circuit therethrough in any suitable manner convenient for the operator.

The open end of the casing 10 is covered by an armature or engaging member 22 which is secured by a key 23 to the free end of sleeve 6 and which has a tapering engaging surface 24 with the end of the casing, its outer edge 25 forming the other flange for the belt pulley. A ring 26 of brass or other non-magnetic material is fitted to the open end of the casing 10 to keep the magnet coil 12 in place and protect it from injury, and spring pressed pins 27 are located in the armature member 22 to bear against the inner or core portion of the casing 10 for normally holding the armature member away from the casing. A nut 28 is threaded on the free end of the sleeve 6 and engages the armature member 22 to securely hold it in place.

A lubricating cup 29 is secured to the end of the shaft and communicates through an angular bore 30 thereof with the surface of the shaft where it is surrounded by the coil spring portion of sleeve 6.

In operation, when the circuit through the magnet is broken the shaft 5 or the driving part is free to turn independent of the belt pulley or driven part so that any suitable mechanism belted to the belt pulley may remain idle during the operation of the motor or other driving mechanism. This is permitted by reason of the fact that the sleeve 6 is then entirely loose within the bore of casing 10 and the armature member 22 is held by the spring pins 27 out of contact with said casing. When, however, the circuit is completed through the magnet the magnet becomes energized and attracts the armature member 22 into engagement therewith at the beveled engaging surface 24, this engagement tending to retard the rotary movement of the armature member and thereby unwind the coil spring portion of the sleeve 6 so that said portion is expanded into tight frictional engagement with the bore of the casing. This engagement between the coil spring portion of the sleeve and the bore of the casing is of great binding force and is sufficient to completely lock the belt pulley with the shaft and thereby cause the mechanism belted to the pulley, to be driven by the motor. As soon as the circuit through the magnet is interrupted the spring pins 27 disengage the armature member 23 from the casing and the coil spring portion of the sleeve 6 is thereby permitted to naturally contract to its normal size and release its engagement with the bore of the casing. The lubricant cup supplies lubricant to all of the working parts and avoids undue wear thereof.

Obviously parts may be reversed so that the magnet is carried by the engaging member or the coil spring may be caused to contract in order to produce the clutching action and various other changes may be made without departing from the spirit and scope of this invention.

What I claim as my invention is;

1. A magnetic clutch, comprising a driving shaft, a coil spring secured thereto at one end, a member secured to the other end of the coil spring, a driven member loosely mounted around the coil spring and normally out of engagement with the other member, and an electro magnet for attracting the driven member and the other member to each other to retard the movement of the said other member and thereby cause the expansion of the coil spring into frictional engagement with the driven member.

2. A magnetic clutch, comprising a driving shaft, a coil spring mounted thereon and secured thereto at one end, an engaging member secured to the other end of the coil spring, a driven member loosely mounted on the coil spring, spring pressed pins for holding the engaging member normally out of engagement with the driven member, and an electro magnet for attracting the driven member and the engaging member to each other to retard the movement of the engaging member and thereby cause the expansion of the coil spring into frictional engagement with the driven member, the spring pressed pins serving to disengage the engaging member from the driven member and permit the coil spring to contract and release the driven member when the magnet is deënergized.

3. A magnetic clutch, comprising a driving shaft, a coil spring mounted thereon and secured thereto at one end, an engaging member secured to the other end of the coil spring, a driven member loosely mounted on the coil spring and having a tapering engaging fit with the engaging member, means for holding the engaging member normally out of engagement with the driven member, and an electro magnet for attracting the driven member and the engaging member to each other to retard the movement of the engaging member and thereby cause the expansion of the coil spring into frictional engagement with the driven member, said means serving to disengage the engaging member from the driven member and permit the coil spring to contract and release the driven member when the magnet is deënergized.

4. A magnetic clutch, comprising a driving shaft, a sleeve mounted thereon and secured at one end thereto, there being a spiral slot in the sleeve forming a coil spring of the intermediate portion thereof, a driven member comprising a casing loosely mounted on the sleeve around the coil spring portion thereof, an electro magnet contained within the casing, an armature member secured to the other end of the sleeve and adapted to be attracted by the magnet into engagement with the casing for retarding the movement of the armature member and causing the coil spring portion of the sleeve to unwind and expand into frictional engagement with the casing, and spring means for disengaging the armature member from the casing when the magnet is deënergized and permitting the coil spring portion of the sleeve to contract and release the casing.

5. A magnetic clutch, comprising a driving shaft, a sleeve mounted thereon and secured at one end thereto, there being a spiral slot in the sleeve forming a coil spring of the intermediate portion thereof, a driven member comprising a cylindrical casing with a concentric cylindrical portion loosely mounted on the sleeve around the coil spring portion thereof, a magnet coil contained within the casing around the inner portion as a core, a pair of collector rings mounted on the casing and connected with the terminals of the magnet coil, brushes engaging the collector rings, a collar mounted on the sleeve against which the casing bears, an armature member keyed to the free end of the sleeve, there being a tapering engaging surface between the armature member and the outer cylindrical portion of the casing, flanges on the casing and the armature member for guiding a belt on the casing as a belt pulley, a ring seated in the end of the casing and protecting the magnet coil, spring pins slidably mounted in the armature member and bearing on the casing for normally holding the armature member out of engagement with the casing, and a lubricant cup mounted on the driving shaft and having communication with the surface thereof within the coil spring portion of the sleeve.

6. A magnetic clutch, comprising a driving member, a coil spring connected therewith, a driven member adapted to be engaged by the coil spring when torsional stress is exerted thereon, an engaging member connected with the coil spring, an electro magnet for attracting the driven member and the engaging member into engagement with each other, and means for normally holding the driven member and the engaging member apart.

7. A magnetic clutch, comprising a driving member, a coil spring connected therewith, an engaging member connected with the coil spring and moved thereby, a driven member adapted to be engaged by the coil spring when the movements of the engaging member are retarded, an electro magnet for causing an engagement between the driven member and the engaging member for retarding the movements of the engaging member and causing the engagement of the coil spring with the driven member, and means for normally preventing engagement between the engaging member and the driven member.

In testimony whereof, I affix my signature, in presence of two witnesses.

THOMAS S. WATSON.

Witnesses:
R. S. CALDWELL,
ANNA F. SCHMIDTBAUER.